United States Patent
Wimmer et al.

(10) Patent No.: US 12,162,609 B1
(45) Date of Patent: Dec. 10, 2024

(54) CONCENTRIC RATCHET PITOT LOCK

(71) Applicant: ROCKWELL COLLINS, INC., Cedar Rapids, IA (US)

(72) Inventors: Dustin J. Wimmer, Colorado Springs, CO (US); Jeffrey Rosado, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 18/348,270

(22) Filed: Jul. 6, 2023

(51) Int. Cl.
   *B64D 25/10* (2006.01)
(52) U.S. Cl.
   CPC .................... *B64D 25/10* (2013.01)
(58) Field of Classification Search
   CPC ........................................ B64D 25/10
   See application file for complete search history.

(56) References Cited

U.S. PATENT DOCUMENTS

| | | | | |
|---|---|---|---|---|
| 4,603,823 A | * | 8/1986 | Ayoub | B64D 17/54 244/150 |
| 6,327,764 B1 | * | 12/2001 | Knoll | B64D 43/02 29/434 |

* cited by examiner

*Primary Examiner* — Richard G Davis
(74) *Attorney, Agent, or Firm* — SNELL & WILMER L.L.P.

(57) ABSTRACT

A pitot tube restraint system is disclosed herein. The pitot tube restrain system includes an outer shaft, a pitot tube coupled to a first end of the outer shaft and extending outward from the outer shaft, a torsion spring disposed around the outer shaft, a stop pad coupled to the first end of the outer shaft, a base disposed adjacent the second end of the outer shaft, an inner shaft having disposed through the outer shaft, a first end of the inner shaft rotationally coupled to the stop pad and a second end of the inner shaft rotationally coupled to the base, a pawl disposed around the inner shaft and adjacent the second end of the outer shaft, the pawl configured to engage the second end of the outer shaft to prevent the pitot tube from rotating in a first direction, and a pawl spring disposed around the inner shaft.

20 Claims, 9 Drawing Sheets

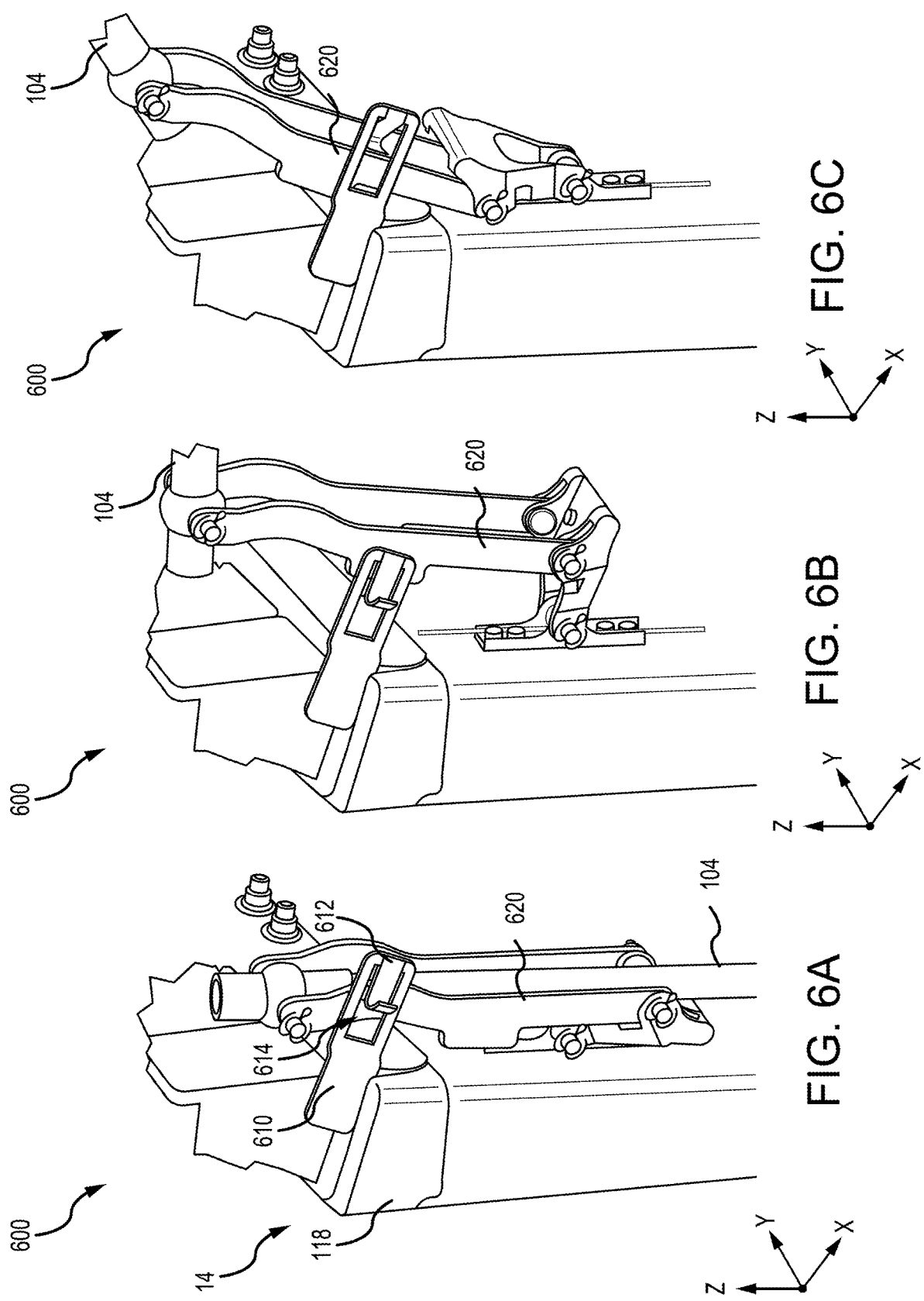

CONCENTRIC RATCHET PITOT LOCK

FIELD

The present disclosure generally relates ejection seats, and more particularly, to deployable pitot tubes mounted to ejection seats.

BACKGROUND

Some ejection seats include deployable pitot tubes that are deployed upon ejection to gather pressure readings in the clean airstream above the cockpit while static pressure data is collected inside the seat back. These pitot tubes are typically stowed in a locked position until they are deployed, at which point they are moved away from the attaching body and into the "clean" air stream to begin taking measurements. "Clean" air may be defined as laminar air flow, and "Dirty" air may be defined as air that is disturbed by aircraft geometry (i.e., turbulent air) or air that may contain particulates of smoke or foreign object debris.

The sensors connected to the pitot tubes help determine the altitude and airspeed of the ejection seat, allowing an on-board computer to determine the mode, or sequence, of ejection that the ejection seat pyrotechnic devices will follow. In some current designs, the deployable pitot mechanisms have typically been prevented from returning to an un-deployed position after deployment by using an over-center linkage feature. Additionally, in some current designs, the deployable pitot tubes can reach a fully extended position but cannot stay in the fully extended position. In some ejection scenarios and with the pressure profiles of some aircraft cockpits the over-center feature can be overcome by external forces.

SUMMARY

Disclosed herein is a pitot tube restraint system. The pitot tube restraint system includes an outer shaft having a first end and a second end, a pitot tube coupled to the first end of the outer shaft and extending outward from the outer shaft, a torsion spring disposed around the outer shaft between the first end and the second end of the outer shaft, a stop pad coupled to the first end of the outer shaft, a base disposed adjacent the second end of the outer shaft, an inner shaft having a first end and a second end and disposed through the outer shaft, the first end of the inner shaft rotationally coupled to the stop pad and the second end of the inner shaft rotationally coupled to the base, a pawl disposed around the inner shaft and adjacent the second end of the outer shaft, the pawl configured to engage the second end of the outer shaft to prevent the pitot tube from rotating in a first direction, and a pawl spring disposed between the pawl and the base and around the inner shaft.

In various embodiments, the torsion spring is configured to extend the pitot tube from a stowed position to a deployed position. In various embodiments, the second end of the outer shaft includes a tooth and the pawl includes a first plurality of teeth, the first plurality of teeth of the pawl configured to engage the tooth of the second end of the outer shaft to prevent the pitot tube from rotating in the first direction. In various embodiments, the second end of the outer shaft further includes a second plurality of teeth configured to engage the first plurality of teeth of the pawl.

In various embodiments, the stop pad is configured to define a deployed position and stop a rotation of the pitot tube at a deployed location. In various embodiments, the pawl spring is configured to be depressed to disengage the pawl from the second end of the outer shaft. In various embodiments, the pawl is configured to engage the base to prevent rotation of the pawl.

Also disclosed herein is an ejection seat including a seat bucket, a seatback coupled to the seat bucket, the seatback having a top side, and a pitot tube system coupled to the seatback. The pitot tube system includes an outer shaft having a first end and a second end, a pitot tube coupled to the first end of the outer shaft and extending outward from the outer shaft, a torsion spring disposed around the outer shaft between the first end and the second end of the outer shaft, a stop pad coupled to the first end of the outer shaft and to the top side of the seatback, a base disposed adjacent the second end of the outer shaft, an inner shaft having a first end and a second end and disposed through the outer shaft, the first end of the inner shaft rotationally coupled to the stop pad and the second end of the inner shaft rotationally coupled to the base, a pawl disposed around the inner shaft and adjacent the second end of the outer shaft, the pawl configured to engage the second end of the outer shaft to prevent the pitot tube from rotating in a first direction, and a pawl spring disposed between the pawl and the base and around the inner shaft.

In various embodiments, the pitot tube system further includes a pitot release mechanism coupled to a first side of the seatback, the pitot release mechanism configured to secure the pitot tube in a stowed position. In various embodiments, the torsion spring is configured to rotate the pitot tube to a deployed position in response to the pitot release mechanism releasing the pitot tube. In various embodiments, the second end of the outer shaft includes a tooth and the pawl includes a first plurality of teeth, the first plurality of teeth of the pawl configured to engage the tooth of the second end of the outer shaft to prevent the pitot tube from rotating in the first direction.

In various embodiments, the second end of the outer shaft further includes a second plurality of teeth configured to engage the first plurality of teeth of the pawl. In various embodiments, the base includes a first portion coupled to the top side of the ejection seat and a second portion extending orthogonally outward from the ejection seat, the second portion being configured to support the inner shaft. In various embodiments, the pawl spring is configured to be depressed to disengage the pawl from the second end of the outer shaft.

Also disclosed herein is an ejection seat including a seatback having a top portion, a pitot tube coupled to the seatback and configured to rotate to a deployed position, and a one-way locking spring clip coupled to the seatback and configured to receive the pitot tube and secure the pitot tube in the deployed position.

In various embodiments, the one-way locking spring clip further includes a base portion, a first side portion coupled to based portion, a second side portion coupled to the base portion, and a clip top portion coupled to the first side portion and the second side portion, wherein the clip top portion defines an opening configured to receive the pitot tube.

In various embodiments, the top portion further includes a first spring portion including a first angled portion coupled to the top portion and extending away from the opening and a second spring portion including a second angled portion opposite the first angled portion, the second angled portion coupled to the top portion and extending away from the opening.

In various embodiments, the top portion further includes a first portion, a second portion configured to separate from the first portion, a second opening in the second portion adjacent the first portion, and a vertical portion extending from the first portion and through the second opening of the second portion. In various embodiments, the ejection seat further includes a support leg coupled to the seatback and configured to support the pitot tube in the deployed position, wherein the one-way locking spring clip is configured to engage and secure the support leg when the pitot tube is in the deployed position. In various embodiments, the one-way locking spring clip further includes a body having a first end and a second end, the first end coupled to the seatback, an opening in the body adjacent the second end of the body, and a spring clip coupled to the second end of the body and configured to pass through the opening to engage the support leg.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 6A, 6B, and 6C illustrate a pitot tube restraining system including a one-way spring clip on an ejection seat, in accordance with various embodiments.

DETAILED DESCRIPTION

Figure 1:
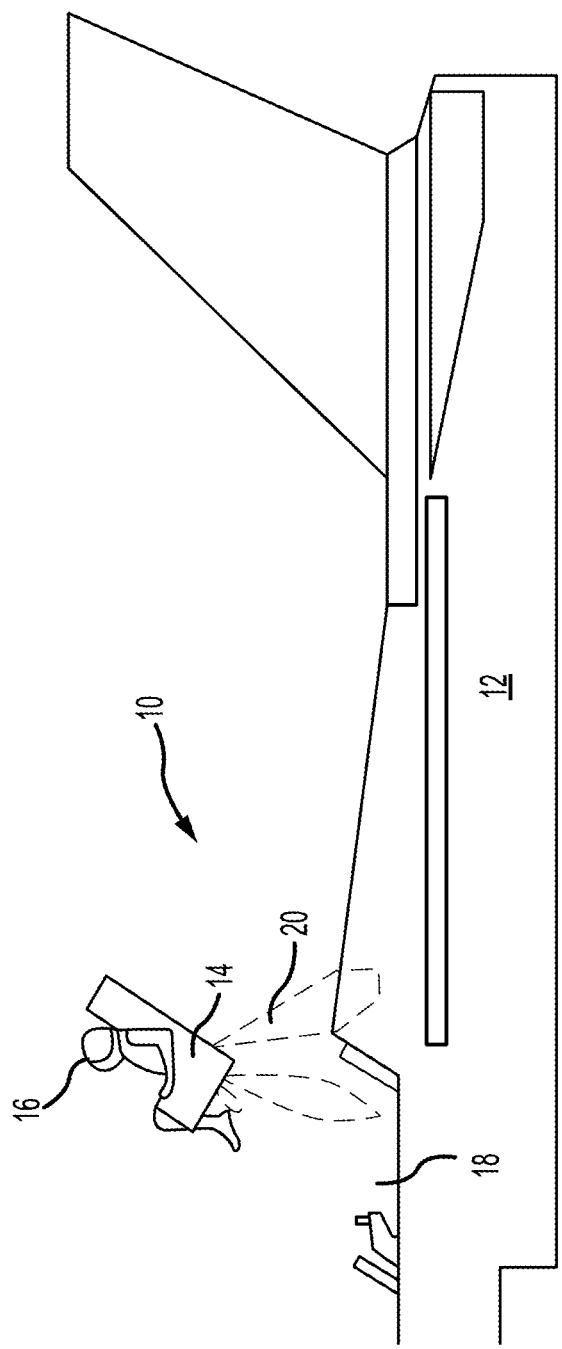
FIG. 1 illustrates an ejection seat being expelled from an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are systems for deploying pitot tubes on ejection seats. The deployable pitot tubes may be deployed upon ejection to gather pressure and other readings in the clean airstream above the cockpit and ejection seat instead of the dirty air around the cockpit and ejection seat. "Clean" air may be defined as laminar air flow, and "Dirty" air may be defined as air that is disturbed by aircraft geometry (i.e., turbulent air) or air that may contain particulates of smoke or foreign object debris.

Upon full deployment, and in various embodiments, a lockout mechanism is used to prevent the pitot tube from rebounding back into the dirty air. In various embodiments, this may be achieved by a one-way spring clip that is attached directly to the aircraft or device. In various embodiments, upon pitot tube deployment, the spring clip may be displaced and allow the pitot tube to move past the spring clip. In various embodiments, once the pitot tube pushes past the retention portion of the spring clip, the pitot tube is prevented from rebounding into the dirty air region. In various embodiments, the retention feature may include a release, allowing the pitot tube to be deployed and re-stowed during testing. In various embodiments, retention may also be accomplished by using a ratcheting mechanism, which would conserve space and reduce the potential of a snag hazard from a clip, such as the spring clip.

In various embodiments, the ratcheting mechanism includes a concentric ratchet about the pitot tube that ensures that the pitot tube does not return from the deployed position and into the dirty air. In various embodiments, the ratchet mechanism may prevent the pitot tube from returning more than a single tooth on the concentric ratchet. In various embodiments, the ratchet pawl may utilize one or more tabs to allow assemblers and maintainers the ability to deploy and reset the pitot mechanism without disassembly.

In various embodiments, the systems disclosed herein may increase the safety of aircrew. In various embodiments, the systems disclosed herein may reduce or eliminate the possibility of the pitot tubes bouncing back into turbulent airflow, thereby ensuring that correct and accurate pressure readings are collected, and that a correct mode is determined by the on-board computer based on the correct and accurate pressure readings. In various embodiments, the systems disclosed herein reduce the number of parts used to deploy the pitot tube as compared to current systems.

Referring now to FIG. 1, an aircraft ejection system 10 is illustrated, in accordance with various embodiments. Aircraft ejection system 10 may be installed in an aircraft 12 to expel an ejection seat 14 and an occupant 16 of ejection seat 14 from a cockpit 18 of aircraft 12. Ejection seat 14 may be urged from cockpit 18 by a propellant 20.

Figure 2:
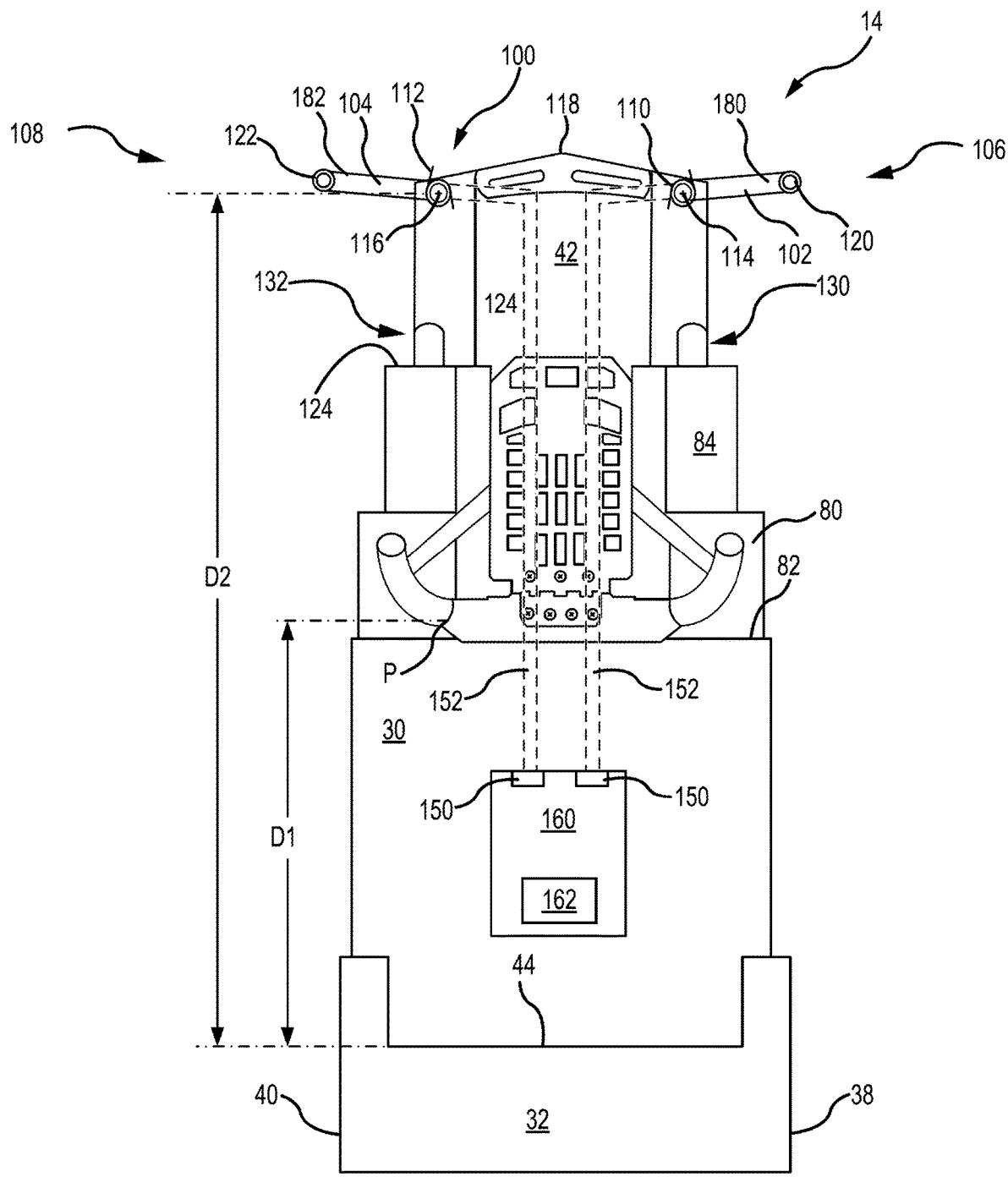
FIG. 2 illustrates an ejection seat having a pitot system, in accordance with various embodiments.

Referring now to FIG. 2, a front view of ejection seat 14 is illustrated, in accordance with various embodiments. In various embodiments, ejection seat 14 includes a seatback 30 and a seat bucket 32. In various embodiments, an ejection handle may be located proximate a frontside of seat bucket 32. The ejection handle may be configured to initiate an ejection sequence upon actuation. For example, occupant 16 (FIG. 1) pulling ejection handle may initiate the ejection sequence that expels ejection seat 14 from aircraft 12.

In various embodiments, ejection seat 14 includes a main parachute assembly 80. Main parachute assembly 80 is located at an upper end 82 of seatback 30. As used herein, the term "upper" refers to an end or surface that is distal to, or generally farthest from, the floor of the cockpit 18 (FIG. 1). A main parachute may be housed in a main parachute container 84 of main parachute assembly 80. The main parachute deploys from main parachute container 84. The main parachute is attached to occupant 16 and is configured to safely convey occupant 16 to the ground after ejection.

In various embodiments, ejection seat 14 includes a pitot system 100. Pitot system 100 is configured to rotate between a stowed position and a deployed position. Pitot system 100 includes a left (or first) pitot tube 102 and a right (or second) pitot tube 104. Left pitot tube 102 is rotatably coupled to a first (or left) side 106 of headrest 42. Right pitot tube 104 is rotatably coupled to a second (or right) side 108 of headrest 42. In various embodiments, left pitot tube 102 may be rotatably coupled to first side 106 of parachute container 84 and right pitot tube 104 may be rotatably coupled to second side 108 of parachute container 84.

In various embodiments, a first tube biasing member 110 is configured to bias left pitot tube 102 away from first side 106 of headrest 42 and toward the deployed position. A second tube biasing member 112 is configured to bias right pitot tube 104 away from second side 108 of headrest 42 and toward the deployed position. Stated differently, first tube biasing member 110 is configured to rotate left pitot tube 102 in a first circumferential direction about an axis of rotation 114 of left pitot tube 102, and second tube biasing member 112 is configured to rotate right pitot tube 104 in a second circumferential direction about an axis of rotation 116 of right pitot tube 104. The second circumferential direction is opposite the first circumferential direction.

Axis of rotation 114 of left pitot tube 102 is opposite, or distal to, a first air inlet 120 of left pitot tube 102. Axis of rotation 116 of right pitot tube 104 is opposite, or distal to, a second air inlet 122 of right pitot tube 104. Left pitot tube 102 and right pitot tube 104 are each coupled to headrest 42 such that axes of rotation 114, 116 are proximate an upper end 118 of headrest 42. Upper end 118 of headrest 42 may be the uppermost point of ejection seat 14. In this regard, axes of rotation 114,116 may be above main parachute assembly 80. Stated differently, axes of rotation 114, 116 may be between an upper surface 124 of main parachute assembly 80 and upper end 118 of headrest 42. In various embodiments, upper end 118 may be a backup canopy breaker, or piercer, and have a dynamic or fixed distance from the floor and/or canopy with relation to the seat back and seat bucket. In the stowed position, first and second air inlets 120, 122 may be located between upper surface 124 of main parachute assembly 80 and axes of rotation 114, 116, respectively. In various embodiments, in the stowed position, first and second air inlets 120, 122 may be located between upper surface 124 of main parachute assembly 80 and upper end 118 of headrest 42. As discussed in further detail below, the location of axis of rotation 114 and axis of rotation 116 are selected such that, when deployed, first air inlet 120 and second air inlet 122 are in the airstream (e.g., outside cockpit 18) after deployment of the ejection system 10 in FIG. 1). In various embodiments, seat bucket 32 and seatback 30 may translate relative headrest 42. Translation of seat bucket 32 and seatback 30 relative to headrest 42 changes a distance D2 between axes of rotation 114, 116 and seat 44 of seat bucket 32. In this regard, prior to ejection, the distance between axes of rotation 114, 116 and a floor of aircraft 12 does not change, but the distance D2 between seat 44 and axes of rotation 114, 116 may be changed depending on the height of occupant 16.

In various embodiments, a first pitot restraint assembly 130 is configured to maintain left pitot tube 102 in a restrained position. A second pitot restraint assembly 132 is configured to maintain right pitot tube 104 in the restrained position. Each of first pitot restraint assembly 130 and second pitot restraint assembly 132 are configured to translate between a restrained state and a released state. Left pitot tube 102 rotates to the deployed position in response to first pitot restraint assembly 130 translating to the released state. Right pitot tube 104 rotates to the deployed position in response to second pitot restraint assembly 132 translating to the released state.

First pitot restraint assembly 130 and second pitot restraint assembly 132 are configured to translate to the released state during expulsion of ejection seat 14. For example, first pitot restraint assembly 130 and second pitot restraint assembly 132 may translate to the released state in response to ejection seat 14 translating a threshold distance from the floor of cockpit 18 (FIG. 1). In various embodiments, first pitot restraint assembly 130 and second pitot restraint assembly 132 may be configured to translate to the released state prior to deployment of the ejection system 10 in FIG. 1).

In the deployed position, fluid (e.g., air) enters left pitot tube 102 via first air inlet 120 and right pitot tube 104 via second air inlet 122. In various embodiments, left and right pitot tubes 102, 104 may be operably connected to pressure sensors 150 via conduits 152. In this regard, the fluid received at first and second air inlets 120, 122 is routed to pressure sensors 150 via conduits 152. Pressure sensors 150 may be part of and/or in communication with a controller 160. Controller 160 is configured to receive pressure measurements from pressure sensors 150. In various embodiments, left pitot tube 102 may further include a temperature sensor 180 and right pitot tube 104 may further include a temperature sensor 182. Temperature sensors 180, 182 may be in electric communication with controller 160. Controller 160 may be configured to receive temperature measurements from temperature sensors 180, 182.

Controller 160 may include one or more of a general-purpose processor, digital signal processor (DSP), application specific integrated circuit (ASIC), field programmable gate array (FPGA), or other programmable logic device, discrete gate, transistor logic, or discrete hardware components, or any various combinations thereof. A tangible, non-transitory computer-readable storage medium 162 may be in communication with controller 160. Storage medium 162 may comprise any tangible, non-transitory computer-readable storage medium known in the art. The storage medium 162 has instructions stored thereon that, in response to execution by controller 160, cause controller 160 to perform operations related to selecting an ejection mode based on dynamic pressure data received from the pressure sensors 150. In this regard, controller 160 receives dynamic pressure data from the pressure sensors 150 and selects an ejection mode based on dynamic pressure data. For example, controller 160 may determine an altitude and an airspeed based on the dynamic pressure data in conjunction with static pressure data and may select a timing sequence for deploying various subsystem of ejection seat 14 (e.g., selects an ejection mode) based on the altitude and airspeed.

Figure 3:
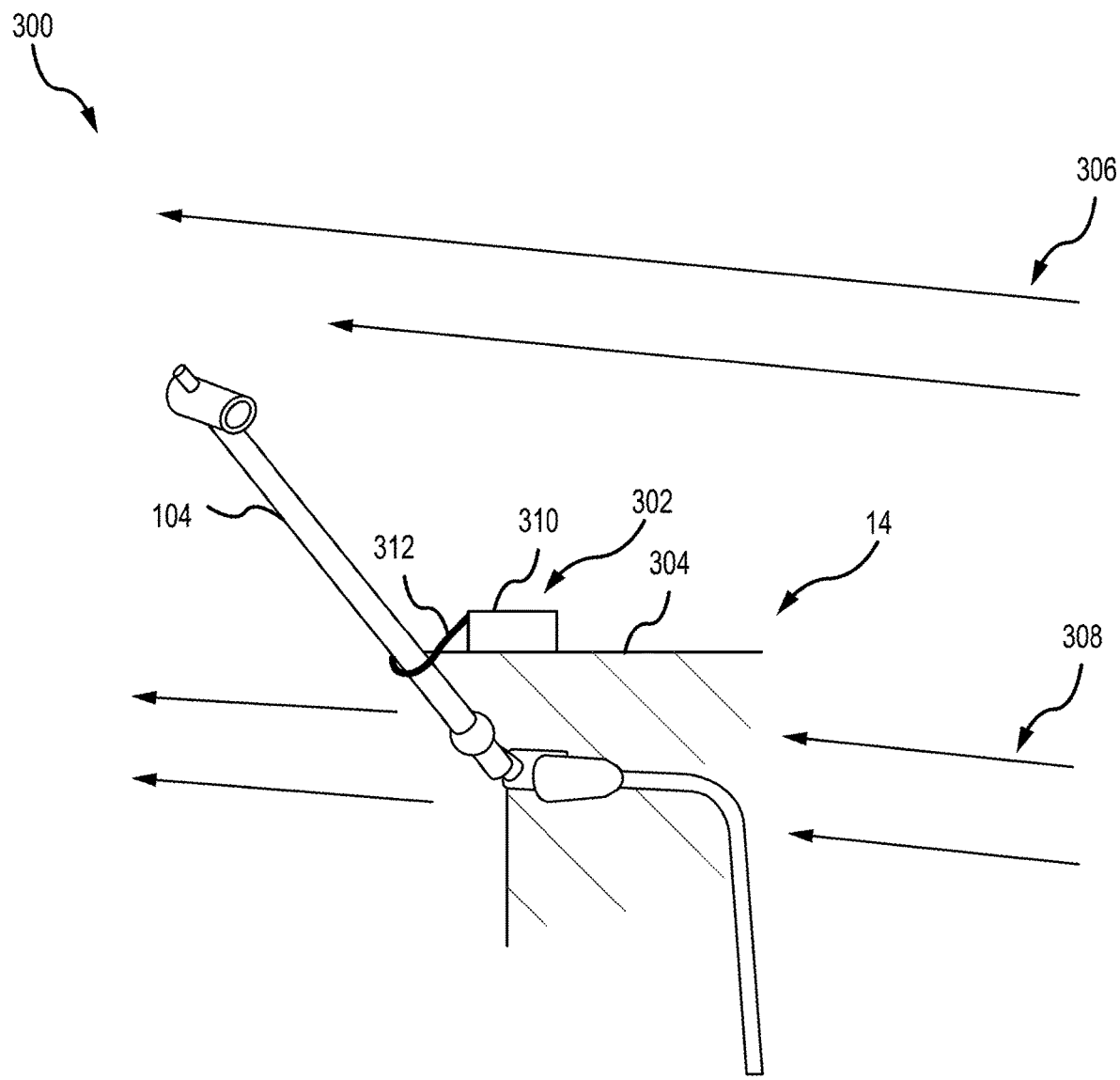
FIG. 3 illustrates a pitot tube restraining system on an ejection seat, in accordance with various embodiments.

Referring now to FIG. 3, a pitot tube restraining system, system 300, is illustrated, in accordance with various embodiments. System 300 may be installed on ejection seat 14 for use with pitot tubes 102, 104. System 300 includes a one-way locking spring clip 302 that is coupled to an uppermost point 304 of ejection seat 14 (e.g., upper end 118 of headrest 42). One-way locking spring clip 302 secures pitot tube 104 in the deployed position and in a clean air stream 306 and out of a dirty air stream 308. One-way locking spring clip 302 includes a body 310 and a spring component 312. Body 310 is configured to be secured to upper most point 304 of ejection seat 14 and be an anchor for spring component 312. Spring component 312 is configured to catch pitot tube 104 as it is deployed and secure pitot tube 104 in the deployed position. In various embodiments, spring component 312 may further be configured to release pitot tube 104 in order to stow pitot tube 104.

Figure 4B:
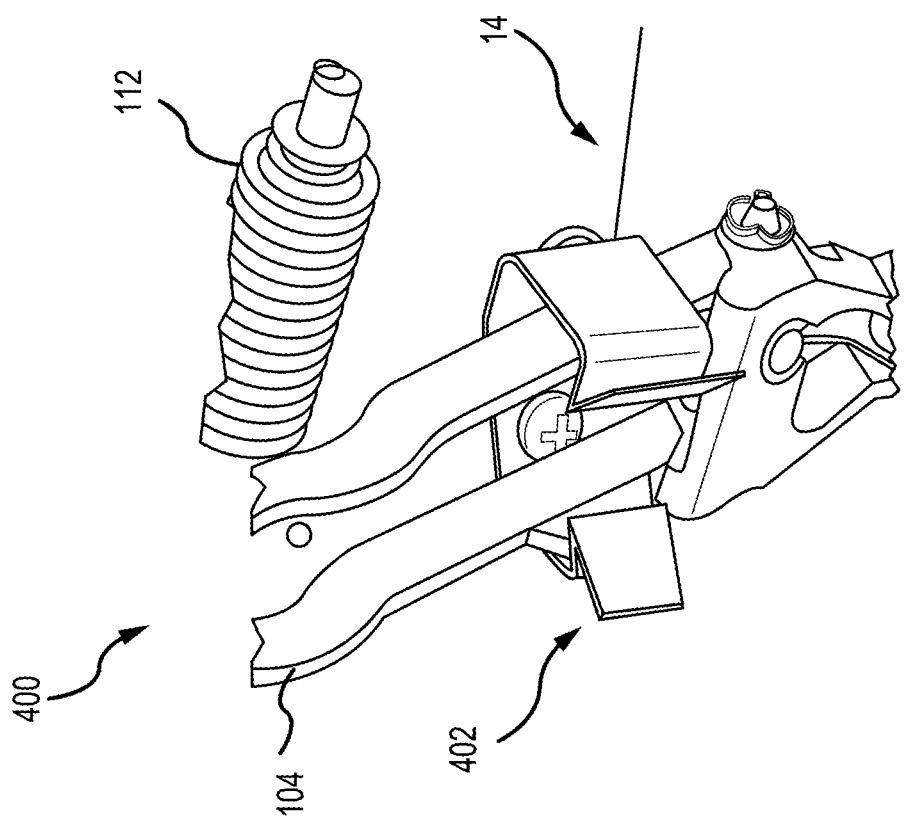
FIGS. 4A and 4B illustrate a pitot tube restraining system including a one-way spring clip on an ejection seat, in accordance with various embodiments.
Figure 4A:
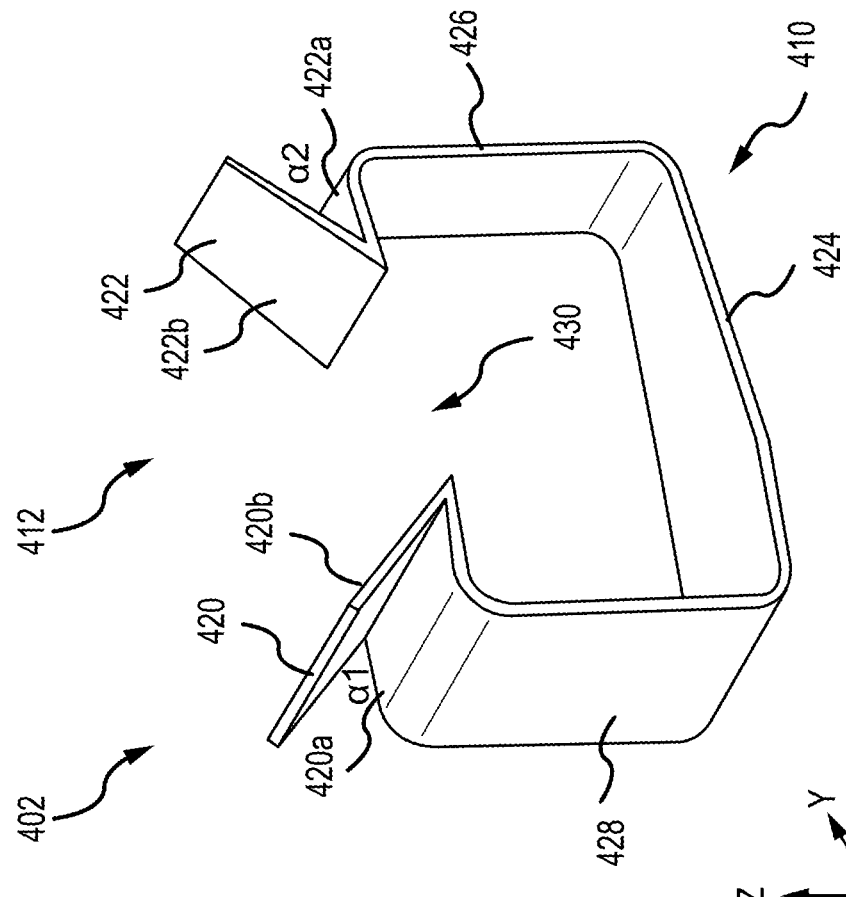

Referring now to FIGS. 4A and 4B, a pitot tube restraining system, system 400, is illustrated, in accordance with various embodiments. System 400 includes a one-way locking spring clip, clip 402, that is coupled to ejection seat 14. FIG. 4A is a perspective view of clip 402 and FIG. 4B is a perspective view of clip 402 securing pitot tube 104. Clip 402 may be an example of one-way locking spring clip 302 described above in FIG. 3. Clip 402 includes a body 410 and a spring component 412. Spring component 412 includes a first side 420 (e.g., in the negative y-direction) and a second side 422 (e.g., in the positive y-direction). First side 420 include a first portion 420a extending in a first direction (e.g., along the y-axis) toward second portion 422b and a second portion 420b extending at an angle α1 upward (e.g., in the positive z-direction) and away from second portion 422b. Second side 422 include a first portion 422a extending in a second direction (e.g., along the y-axis) opposite the first direction and toward first side 420 and a second portion 422b extending at an angle α2 upward (e.g., in the positive z-direction) and away from first side 420.

Body 410 includes a bottom portion 424 (e.g., in the negative z-direction), a right-side portion 426 (e.g., in the positive y-direction), and a left-side portion 428 (e.g., in the negative y-direction) with spring component 412 being a top portion of body 410. Body 410 further includes an opening 430 between first side 420 and second portion 422b and into body 410 that is configured to receive pitot tube 104. Bottom portion 424 is secured to ejection seat 14 (e.g., upper end 118, upper most point 304).

Pitot tube 104 rotates upward (e.g., in the positive z-direction) aided by second tube biasing member 112 until pitot tube 104 contacts clip 402. Pitot tube 104 contacts second portion 420b of first side 420 and second portion 422b and slides along the angled surfaces of portions 420b, 422b. The force of pitot tube 104 causes right-side portion 426 and left-side portion 428 to bend or flex, causing first portion 420a and first portion 422a to separate, thereby enlarging opening 430 to receive pitot tube 104. After pitot tube 104 passes by spring component 412, right-side portion 426 and left-side portion 428 return to their original position, securing pitot tube 104 in the deployed position, as illustrated in FIG. 4B.

Figure 5B:
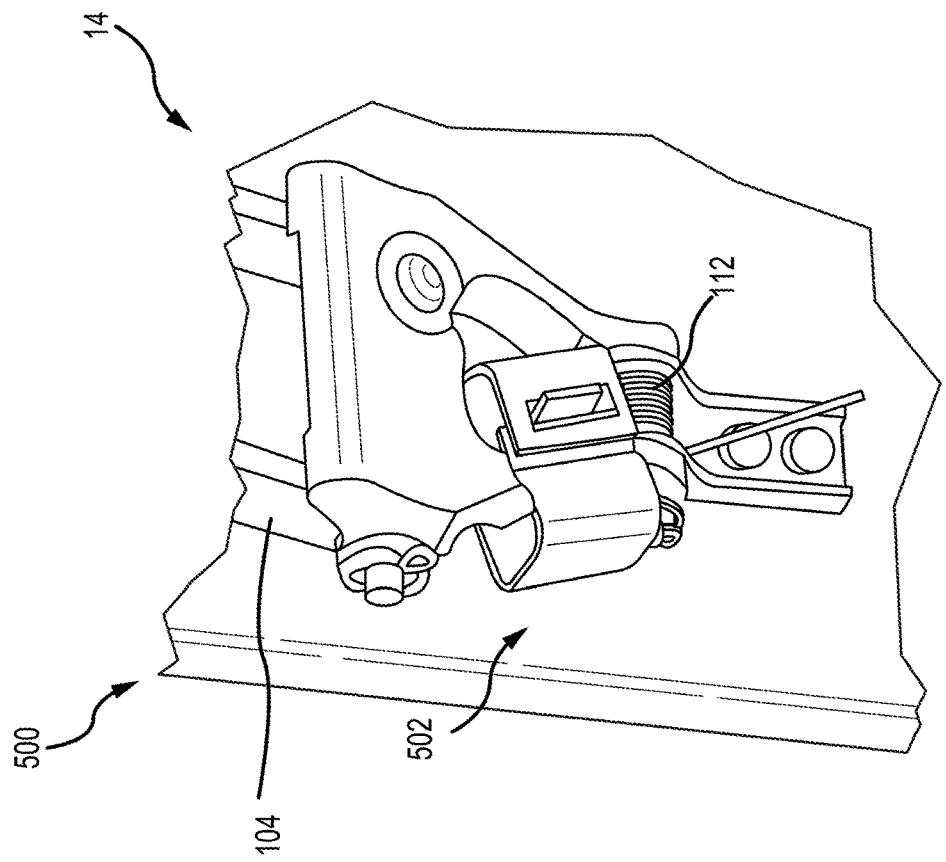
FIGS. 5A and 5B illustrate a pitot tube restraining system including a one-way spring clip with a catch on an ejection seat, in accordance with various embodiments.
Figure 5A:
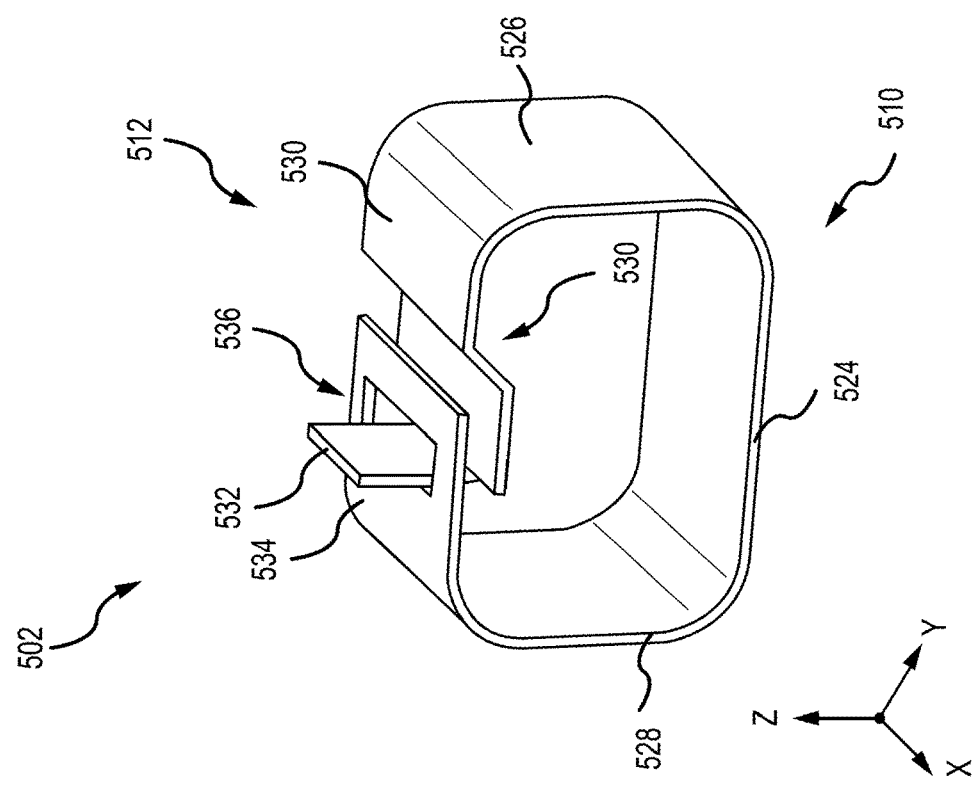

Referring now to FIGS. 5A and 5B, a pitot tube restraining system, system 500, is illustrated, in accordance with various embodiments. System 500 includes a one-way locking spring clip, clip 502, that is coupled to ejection seat 14. FIG. 5A is a perspective view of clip 502 and FIG. 5B is a perspective view of clip 502 securing pitot tube 104. Clip 502 may be an example of one-way locking spring clip 302 described above in FIG. 3. Clip 502 includes similar components to those described above with respect to clip 402 in FIGS. 4A and 4B, including a body 510, a spring component 512, bottom portion 524, a right-side portion 526, and a left side portion 528 with spring component 512 being a top portion of body 510, descriptions of which may not be repeated below.

Spring component 512 further includes a first portion 530 coupled to right side 526 and extending in a first direction (e.g., in the negative y-direction), a vertical portion 532 coupled to first portion 530 and extending orthogonally from first portion 530 (e.g., in the positive z-direction), a second portion 534 coupled to left side 528 and extending in a second direction that is opposite the first direction (e.g., in the positive y-direction), and an opening 536 formed in second portion 534. Opening 536 is configured to align with vertical portion 532, allowing vertical portion 532 to pass through opening 536.

Pitot tube 104 rotates upward (e.g., in the positive z-direction) aided by second tube biasing member 112 until pitot tube 104 contacts clip 502. Pitot tube 104 contacts first portion 530, pushing first portion 530 into opening 530 (e.g., in the negative z-direction). After pitot tube 104 passes second portion 534, first portion 530 returns to its original position with vertical portion 532 passing through opening 536, securing pitot tube 104 in the deployed position as illustrated in FIG. 5B.

Referring now to FIGS. 6A-6C, perspective views of a pitot tube restraining system, system 600, is illustrated, in accordance with various embodiments. System 600 includes a one-way locking spring clip, clip 602, that is coupled to ejection seat 14. FIG. 6A illustrates clip 602 when pitot tube 104 is in the stowed position, FIG. 6B illustrates clip 602 when pitot tube 104 is partially deployed, and FIG. 6C illustrated clip 602 when pitot tube 104 is in the deployed position. Clip 602 may be an example of one-way locking spring clip 302 described above in FIG. 3. Clip 602 includes a body 610 and a spring component 612.

Body 610 has a first end that is coupled to ejection seat 14, and more specifically, to ejection seat 14, and more specifically to upper end 118 of ejection seat 14, and a second end that is coupled to spring component 612. Body 610 extends outward (e.g., in the positive x-direction) from ejection seat 14 and adjacent pitot tube 104. More specifically, body 610 is disposed adjacent a support leg 620 of pitot tube 104. Body 610 includes an opening 614 through which spring component 612 may pass near the second end of body 610.

Spring component 612 is coupled to the second end of body 610 and extends toward ejection seat 14 (e.g., in the negative x-direction). Spring component 612 is biased to move toward pitot tube 104 (e.g., in the positive y-direction). When pitot tube 104 is in the stowed position, spring component 612 is disposed adjacent to and pressing against support leg 620 of pitot tube 104, as illustrated in FIG. 6A. As pitot tube 104 moves from the stowed position to the deployed position, spring component 612 maintains pressure against support leg 620, as illustrated in FIG. 6B. Spring component 612 passes through opening 614 (e.g., in the positive y-direction) and engages support leg 620, securing support leg 620 and therefore pitot tube 104 in the deployed position, in response to pitot tube 104 reaching the deployed position, as illustrated in FIG. 6C.

Figure 7A:
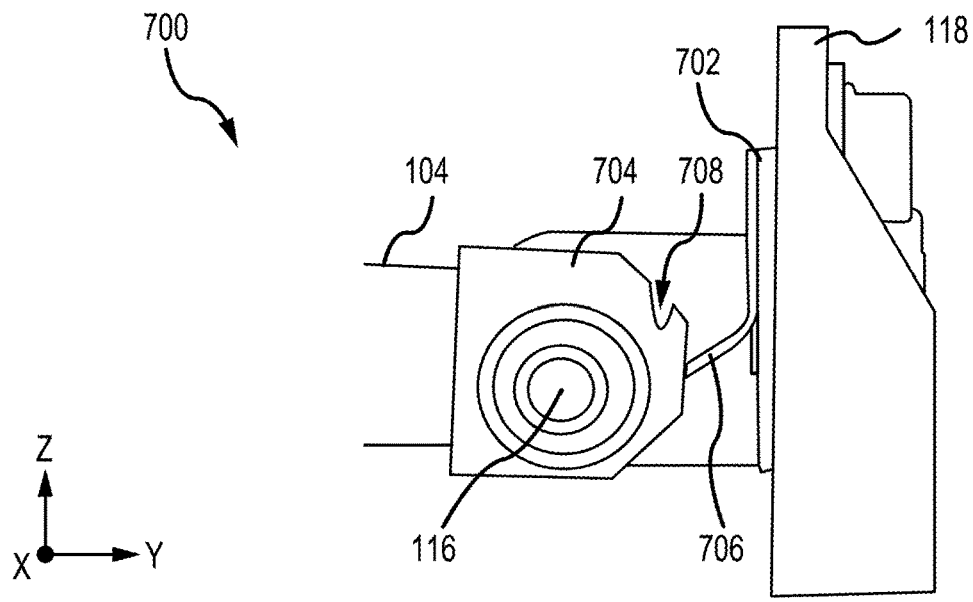
FIGS. 7A and 7B illustrate a pitot tube restraining system including a ratchet, in accordance with various embodiments.
Figure 7B:
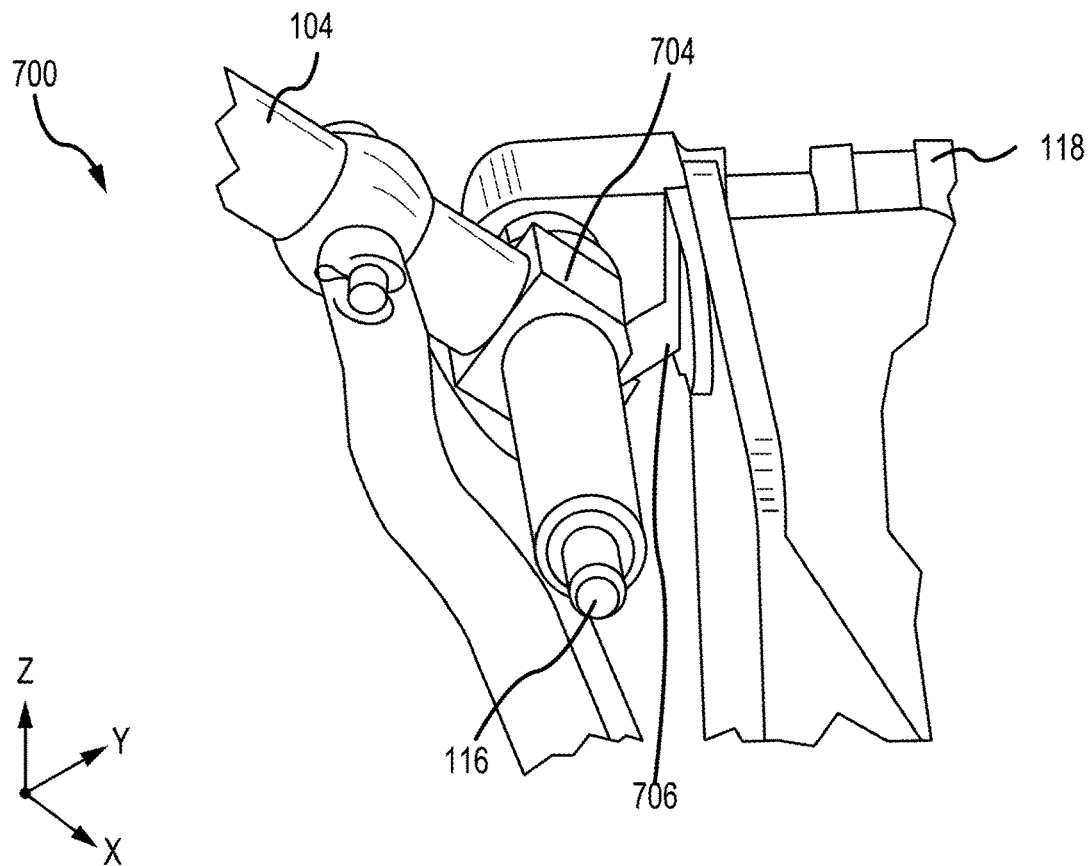

Referring now to FIGS. 7A and 7B, a pitot tube restraining system, system 700, is illustrated, in accordance with various embodiments. FIG. 7A is a side view of system 700 in an unlocked, or disengaged, state and FIG. 7B is a perspective view of system 700 in a locked, or engaged, state. System 700 includes a base 702, a ratchet 704, and a pawl 706. Base 702 is coupled to ejection seat 14, and more specifically to upper end 118 of ejection seat 14. Pawl 706 is coupled to base 702 and is configured to engage ratchet 704. In various embodiments, pawl 706 may include metal, plastic, or some combination of metal and plastic. In various embodiments, pawl 706 may include a vertical portion (e.g., extending along the z-axis) and a second portion that bends toward ratchet 704 off vertical. The second portion may be biased to engage ratchet 704. In various embodiments, pawl 706 may be more complicated including one or more springs, an axis of rotation, and a biasing member configured to engage ratchet 704.

Ratchet 704 is disposed about axis of rotation 116 of pitot tube 104. Ratchet 704 includes an indent 708 around an outer circumference of ratchet 704. Indents 708 is sized and positioned to rotate in a first direction (e.g., in the clockwise direction) past pawl 706 and to engage pawl 706 to prevent rotation in a second direction (e.g., in the counterclockwise direction). This secures pitot tube 104 in the deployed position. In various embodiment, ratchet 704 may include more than one indent 708 to ensure that pitot tube 104 is secured in the deployed position.

Figure 8A:
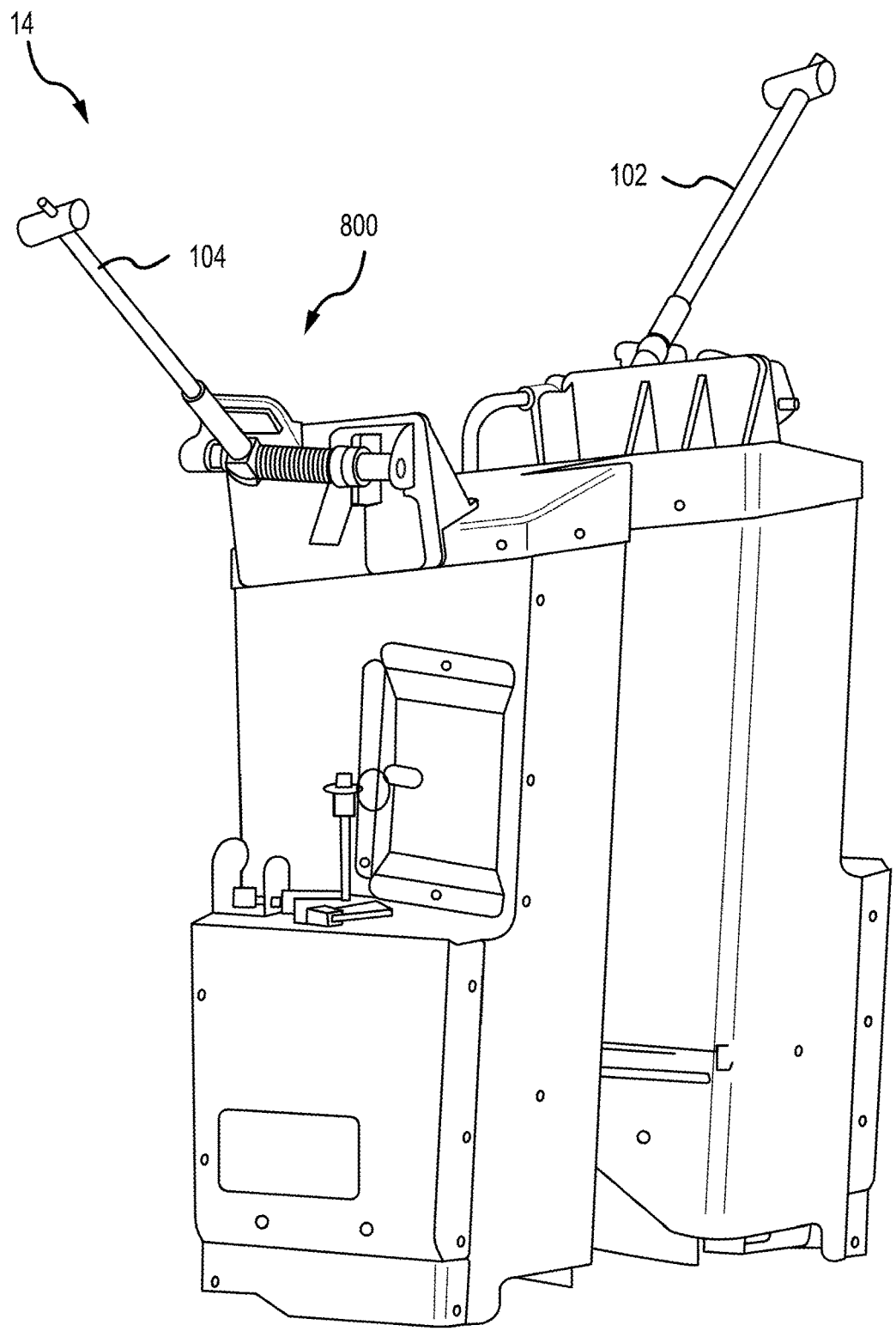
FIGS. 8A, 8B, and 8C illustrate a pitot tube restraining system including concentric ratchet on an ejection seat, in accordance with various embodiments.
Figure 8C:
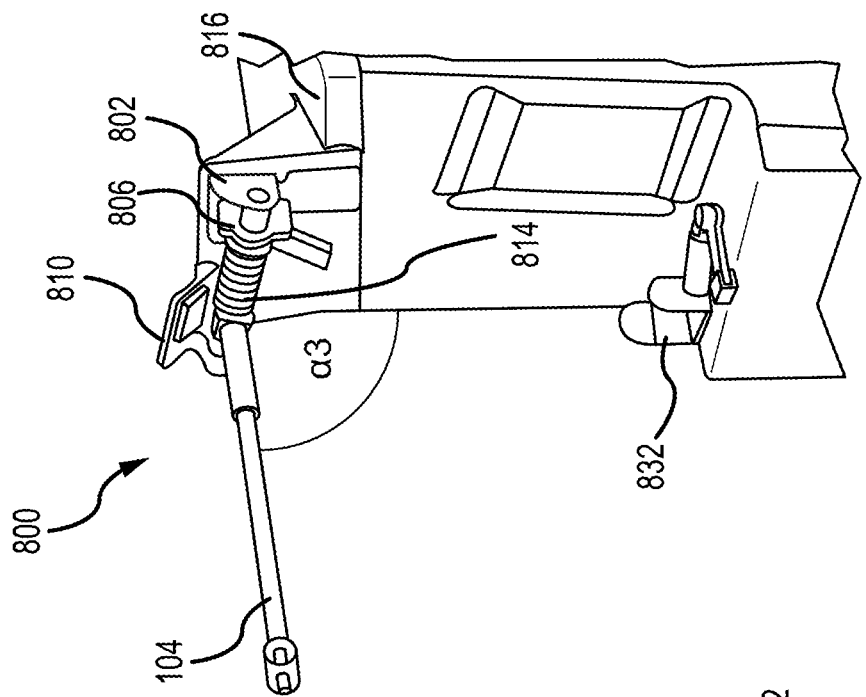
Figure 8B:
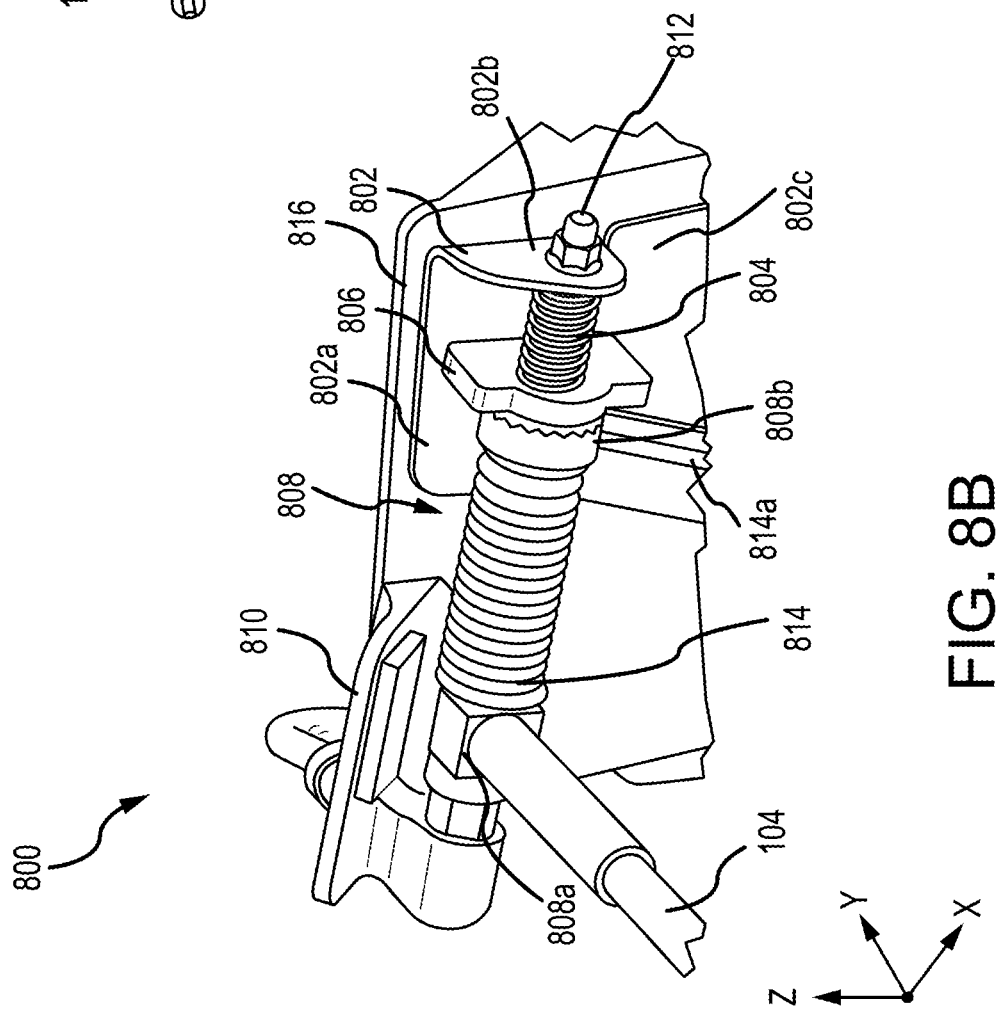

Referring now to FIGS. 8A-8C, a pitot tube restraining system, system 800, is illustrated, in accordance with various embodiments. FIG. 8A is a perspective view of an ejection seat (e.g., ejection seat 14) including pitot tubes (e.g., pitot tubes 102, 104) and system 800. FIGS. 8B and 8C are close up perspective views of system 800 with pitot tube 104 in the deployed position. System 800 includes a base 802, a pawl spring 804, a pawl 806, a pitot pivot shaft 808, a stop pad 810, an inner pitot tube shaft 812, and a torsion spring 814. Pitot pivot shaft 808 includes a first end 808*a* and a second end 808*b*. Pitot tube 104 is coupled to and extends from first end 808*a* of pitot pivot shaft 808. Torsion spring 814 is disposed around pitot pivot shaft 808 and between first end 808*a* and second end 808*b*. Torsion spring 814 includes a first end 814*a* that extends away from torsion spring 814 and engages ejection seat to provide a biasing force to rotate pitot tube 104 from the stowed position to the deployed position. Inner pitot tube shaft 812 extends through pitot pivot shaft 808 and is supported by stop pad 810 at a first end and by base 802 at a second end. A pitot release mechanism 832 is coupled to ejection seat 14 to secure pitot tube in the stowed position prior to deployment.

Base 802 is coupled to ejection seat 14, and more specifically, to an upper portion 816 of ejection seat 14. Base 802 includes a first portion 802*a* that is secured to ejection seat 14, a second portion 802*b* extending orthogonally outward (e.g., in the negative y-direction) from first portion 802*a*, and a third portion 802*c* extending orthogonally downward (e.g., in the negative z-direction) from first portion 802*a*. Second portion 802*b* is configured to support inner pitot tube shaft 812 allowing pitot tube 104 to rotate about an axis of rotation (e.g., axis of rotation 116). Third portion 802*c* is secured to ejection seat 14. Pawl 806 is disposed around inner pitot tube shaft 812 and adjacent second end 808*b* of pitot pivot shaft 808. Pawl spring 804 is disposed around inner pitot tube shaft 812 and between second portion 802*b* of base 802 and pawl 806. Pawl spring 804 provides a force (e.g., in the negative x-direction) on pawl 806 to keep pawl 806 engaged with second end 808*b* of pitot pivot shaft 808. Pawl spring 804 further allows pawl 806 to be depressed by an external force, disengaging pawl 806 from second end 808*b* of pitot pivot shaft 808. The external force depresses, or moves, pawl 806 away from second end 808*b* (e.g., in the positive x-direction).

In various embodiments, pawl 806 is configured to engage base 802 to prevent pawl 806 from rotating. In various embodiments, pawl 806 includes a plurality of teeth that are configured to engage second end 808*b* of pitot pivot shaft 808. In various embodiments, second end 808*b* of pitot pivot shaft 808 includes a tooth that is configured to engage the plurality of teeth on pawl 806. In various embodiments, second end 808*b* of pitot pivot shaft 808 includes a plurality of teeth that are configured to engage the plurality of teeth on pawl 806. Accordingly, second end 808*b* of pitot pivot shaft 808 and pawl 806 work together as a ratchet that allows pitot tube 104 to move from the stowed position to the deployed position but not back to the stowed position. In other words, pitot pivot shaft 808 is configured to rotate in a first direction (e.g., clockwise) and pawl 806 is configured to prevent pitot pivot shaft 808 from rotating a second direction (e.g., counterclockwise). However, pawl 806 may be depressed thereby disengaging the plurality of teeth and allowing pitot pivot shaft 808 and pitot tube 104 to rotate in the second direction (e.g., counterclockwise).

Stop pad 810 further provides a fixed location to stop pitot tube 104 at the deployed position. Stop pad 810 allows pitot tube 104 to be deployed quickly and accurately from the stowed position to the deployed position. There is a third angle α3 of rotation between the stowed position and the deployed position. Third angle α3 is about 90° to about 180°, and more specifically, about 100° to about 150°. Pitot tube 104 is illustrated in the deployed position in FIG. 8A and partially deployed (i.e., about) 90° in FIGS. 8B and 8C.

In various embodiments, system 800 improves the performance of pitot tube 104 by ensuring that pitot tube 104 moves to the deployed position and stays in the deployed position. In various embodiments, system 800 reduces the number of components used to deploy and secure pitot tube 104. Other benefits of system 800 will be readily apparent to those skilled in the art.

As described herein, a controller may comprise one or more processors configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. The controller may further comprise memory to store data, executable instructions, system program instructions, and/or controller instructions to implement the control logic of the controller.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A pitot tube restraint system, comprising:
an outer shaft having a first end and a second end;
a pitot tube coupled to the first end of the outer shaft and extending outward from the outer shaft;
a torsion spring disposed around the outer shaft between the first end and the second end of the outer shaft;
a stop pad coupled to the first end of the outer shaft;
a base disposed adjacent the second end of the outer shaft;
an inner shaft having a first end and a second end and disposed through the outer shaft, the first end of the inner shaft rotationally coupled to the stop pad and the second end of the inner shaft rotationally coupled to the base;
a pawl disposed around the inner shaft and adjacent the second end of the outer shaft, the pawl configured to engage the second end of the outer shaft to prevent the pitot tube from rotating in a first direction; and
a pawl spring disposed between the pawl and the base and around the inner shaft.

2. The pitot tube restraint system of claim 1, wherein the torsion spring is configured to extend the pitot tube from a stowed position to a deployed position.

3. The pitot tube restraint system of claim 1, wherein the second end of the outer shaft includes a tooth and the pawl includes a first plurality of teeth, the first plurality of teeth of the pawl configured to engage the tooth of the second end of the outer shaft to prevent the pitot tube from rotating in the first direction.

4. The pitot tube restraint system of claim 3, wherein the second end of the outer shaft further includes a second plurality of teeth configured to engage the first plurality of teeth of the pawl.

5. The pitot tube restraint system of claim 1, wherein the stop pad is configured to define a deployed position and stop a rotation of the pitot tube at a deployed location.

6. The pitot tube restraint system of claim 1, wherein the pawl spring is configured to be depressed to disengage the pawl from the second end of the outer shaft.

7. The pitot tube restraint system of claim 1, wherein the pawl is configured to engage the base to prevent rotation of the pawl.

8. An ejection seat, comprising:
a seat bucket;
a seatback coupled to the seat bucket, the seatback having a top side; and a pitot tube system coupled to the seatback, the pitot tube system including:
- an outer shaft having a first end and a second end;
- a pitot tube coupled to the first end of the outer shaft and extending outward from the outer shaft;
- a torsion spring disposed around the outer shaft between the first end and the second end of the outer shaft;
- a stop pad coupled to the first end of the outer shaft and to the top side of the seatback;
- a base disposed adjacent the second end of the outer shaft;
- an inner shaft having a first end and a second end and disposed through the outer shaft, the first end of the inner shaft rotationally coupled to the stop pad and the second end of the inner shaft rotationally coupled to the base;
- a pawl disposed around the inner shaft and adjacent the second end of the outer shaft, the pawl configured to engage the second end of the outer shaft to prevent the pitot tube from rotating in a first direction; and
- a pawl spring disposed between the pawl and the base and around the inner shaft.

9. The ejection seat of claim 8, the pitot tube system further comprising:
- a pitot release mechanism coupled to a first side of the seatback, the pitot release mechanism configured to secure the pitot tube in a stowed position.

10. The ejection seat of claim 9, wherein the torsion spring is configured to rotate the pitot tube to a deployed position in response to the pitot release mechanism releasing the pitot tube.

11. The ejection seat of claim 8, wherein the second end of the outer shaft includes a tooth and the pawl includes a first plurality of teeth, the first plurality of teeth of the pawl configured to engage the tooth of the second end of the outer shaft to prevent the pitot tube from rotating in the first direction.

12. The ejection seat of claim 11, wherein the second end of the outer shaft further includes a second plurality of teeth configured to engage the first plurality of teeth of the pawl.

13. The ejection seat of claim 8, wherein the base includes a first portion coupled to the top side of the ejection seat and a second portion extending orthogonally outward from the ejection seat, the second portion being configured to support the inner shaft.

14. The ejection seat of claim 8, wherein the pawl spring is configured to be depressed to disengage the pawl from the second end of the outer shaft.

15. An ejection seat, comprising:
- a seatback having a top portion;
- a pitot tube coupled to the seatback and configured to rotate to a deployed position; and
- a one-way locking spring clip coupled to the seatback and configured to receive the pitot tube and secure the pitot tube in the deployed position.

16. The ejection seat of claim 15, wherein the one-way locking spring clip further comprises:
- a base portion;
- a first side portion coupled to based portion;
- a second side portion coupled to the base portion; and
- a clip top portion coupled to the first side portion and the second side portion, wherein the clip top portion defines an opening configured to receive the pitot tube.

17. The ejection seat of claim 16, wherein the top portion further comprises:
- a first spring portion including a first angled portion coupled to the top portion and extending away from the opening; and
- a second spring portion including a second angled portion opposite the first angled portion, the second angled portion coupled to the top portion and extending away from the opening.

18. The ejection seat of claim 16, wherein the top portion further comprises:
- a first portion;
- a second portion configured to separate from the first portion;
- a second opening in the second portion adjacent the first portion; and
- a vertical portion extending from the first portion and through the second opening of the second portion.

19. The ejection seat of claim 15, further comprising:
- a support leg coupled to the seatback and configured to support the pitot tube in the deployed position, wherein the one-way locking spring clip is configured to engage and secure the support leg when the pitot tube is in the deployed position.

20. The ejection seat of claim 19, wherein the one-way locking spring clip further comprises:
- a body having a first end and a second end, the first end coupled to the seatback;
- an opening in the body adjacent the second end of the body; and
- a spring clip coupled to the second end of the body and configured to pass through the opening to engage the support leg.

\* \* \* \* \*